United States Patent [19]

Kuperman et al.

[11] Patent Number: 5,903,473
[45] Date of Patent: May 11, 1999

[54] RADAR SCATTERING NETTING SIMULATION

[75] Inventors: Gilbert G. Kuperman; Kenneth S. Crum, both of Dayton, Ohio

[73] Assignee: The United States of America as represented by the Secretary of the Air Force, Washington, D.C.

[21] Appl. No.: 08/789,453

[22] Filed: Jan. 27, 1997

[51] Int. Cl.[6] .................................................. G06F 15/00
[52] U.S. Cl. ............................................... 364/512
[58] Field of Search ............................................. 364/512

[56] References Cited

U.S. PATENT DOCUMENTS

| | | | |
|---|---|---|---|
| 3,187,331 | 6/1965 | Beller . | |
| 4,021,974 | 5/1977 | Edwards | 52/63 |
| 5,005,147 | 4/1991 | Krishen et al. | 364/578 |

*Primary Examiner*—Kevin J. Teska
*Assistant Examiner*—Hugh Jones
*Attorney, Agent, or Firm*—Gerald B. Hollins; David E. Franklin; Thomas L. Kundert

[57] ABSTRACT

A computer implemented method and system for preparing a description of an electromagnetic scattering net approximating an actual scattering net for analyzing effect on sensor imagery is comprised of: (1) inputting a basic tent configuration comprising a number of tent poles, spacing of tent poles, a covering net, an amount of net sag, and plurality of locations of ground anchor points, representing the design variables selected by an operator from which a net can be modeled; (2) dividing the overall net shape into a plurality of large facets that describe the overall shape conforming to the basic net configuration; (3) subdividing each large facet into a plurality of small facets in accordance with the input number of small facets per large facets chosen so that the small facets correspond in wavelength to the scattering of an actual scattering net; (5) rotating each small facet to achieve an approximation of the signature reduction of an actual scattering net; and (6) outputting a description of rotated small facets. The invention supports the application of CAD and sensor/seeker simulation methods and tools to the evaluation of the effectiveness of a variety of radar scattering net design and employment practices. It supports the capability to produce radar imagery or signal predictions which include the effects of radar scattering net treatment. The resulting predicted imagery or signals may be used to support mission planning and rehearsal, imagery analyst training, weapon system operator training, weapon seeker algorithm development, and automatic target cueing and recognition algorithm development.

15 Claims, 9 Drawing Sheets

RADAR SCATTERING NETTING SIMULATION

RIGHTS IN THE GOVERNMENT

The invention described herein may be manufactured and used by or for the Government of the United States for all governmental purposes without the payment of any royalty.

BACKGROUND OF THE INVENTION

1. Field of the Invention

The present invention relates generally to the field of testing via simulation an electromagnetic radiation (including radar) scattering design of passive netting.

2. Description of the Prior Art

Radar scattering nets are used as a signature denial/ reduction treatment to reduce the detectability/observability of high value assets to exploitation by reconnaissance, target acquisition, and weapon guidance seekers employing imaging and non-imaging radar wavelength sensor technologies. This class of treatment is used by friendly forces to protect vehicles, activities, and structures from enemy threat systems and by enemy forces as a countermeasure to sensors and weapons. This invention supports the application of Computer Aided Design (CAD) and sensor/seeker simulation methods and tools to the evaluation of the effectiveness of a variety of radar scattering net design and employment practices. It supports the capability to produce radar imagery or signal predictions which include the effects of radar scattering net treatment. The resulting predicted imagery or signals may be used to support mission planning and rehearsal, imagery analyst training, weapon system operator training, weapon seeker algorithm development, and automatic target cueing and recognition algorithm development.

Radar scattering nets typically include a netting of strong weather-resistant fiber, such as nylon. This netting provides strength and a substrate onto which the signature denial/ reduction treatments can be added. Examples of such treatment include infrared reflection/emission, colors chosen to match the surroundings, radar absorbing materials, and radar reflecting/scattering materials. With respect to the radar reflecting materials, the radar scattering nets are generally configured to reflect the energy in a uniform direction. Passive devices such as radar scattering nets may be approached by a mobile radar from any aspect. Consequently, the objective is to scatter the energy in a more random fashion to both mimic terrain and to disguise the radar returns characteristic of vehicles or other targets stored beneath the nets.

Prior to this invention, when designing radar scattering nets actual radar scattering nets had to be deployed over actual (or surrogate) vehicles or other items during field trials. Actual sensors and/or seekers would have to be employed to gather representative imagery or signals. Different types of nets would have to be procured and employed to include the effects of different nets designs. Sensor employment geometry's would have to varied over a very large range of angles and in very fine increments to ensure accurately capturing the sensitivity of target signature to small changes in sensor paintings. Prior practice is very expensive, time consuming, and cumbersome.

SUMMARY OF THE INVENTION

The present invention has a number of advantages and new features:

1. The ability to generate a CAD file representative of a radar scattering (target signature reduction) net, in a standard CAD format (e. g., ACAD), which may be input to electromagnetic code to produce a radar image or signal prediction (e. g., a simulated seeker acquisition ranging (SAR) image);

2. The ability to manipulate the size, method of application (i. e., type of tenting or draping), amount of sag, and amount of radar scattering, in a controlled fashion;

3. The ability to superimpose or otherwise merge the output netting CAD file with a second CAD file (such as that representing a military target).

The present invention is a computer implemented method and system for preparing a description of an electromagnetic scattering net approximating an actual scattering net for analyzing effect on sensor imagery comprising: (1) inputting a basic tent configuration comprising a number of tent poles, spacing of tent poles, a covering net, an amount of net sag, and plurality of locations of ground anchor points, representing the design variables selected by an operator from which a net can be modeled; (2) dividing the overall net shape into a plurality of large facets that describe the overall shape conforming to the basic net configuration; (3) subdividing each large facet into a plurality of small facets in accordance with the input number of small facets per large facets chosen so that the small facets correspond in wavelength to the scattering of an actual scattering net; (5) rotating each small facet to achieve an approximation of the signature reduction of an actual scattering net; and (6) outputting a description of rotated small facets.

The present invention produces an approximation of an actual scattering net by breaking the net shape into a plurality of adjoining triangles and by rotating these triangles to enable target signal reduction analysis. Triangles are the simplest shapes for decomposing a net shape into flat surfaces suitable for electromagnetic analysis programs. Rotating the small triangles approximates typical actual scattering netting that allows a more random reflection.

DETAILED DESCRIPTION

The invention is intended to produce a CAD file which may be combined with other CAD files of targets. The joint (netting+target) CAD file is input to an electromagnetic code (EM) mathematical model to produce a simulated image or signal as might be produced by an actual radar system or weapon seeker. See FIG. 1.

Figure 1:
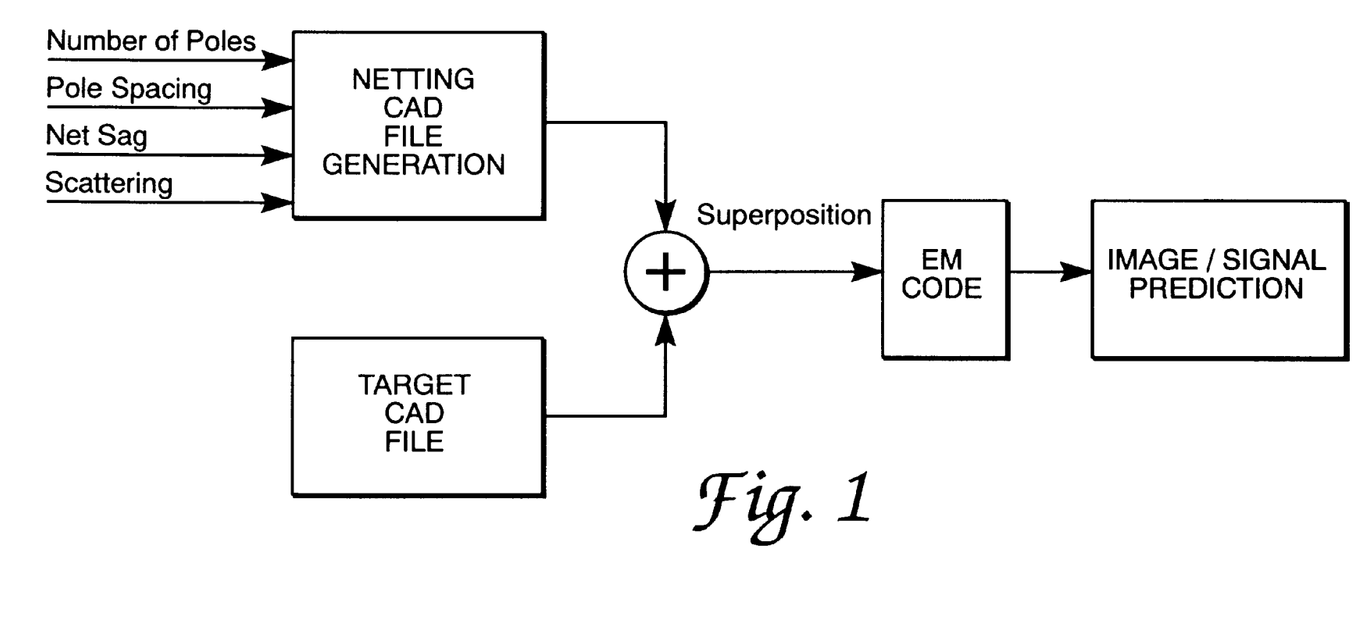
FIG. 1 is an overview of SAR Image Simulation Process.

FIG. 1 depicts the process of generating a predicted image or signal from the superimposed netting and target CAD files. The target CAD files are developed by the intelligence and materiel acquisition communities. These models, either in constructive solid geometry or faceted formats, can be highly detailed representations of vehicles and other objects of military/non-military interest. The models can include variants (e. g., adaptations of the same basic vehicle) and articulation (e. g., the hatches on a tank may be open, the turret may be rotated, or the gun tube may be elevated). The superposition of the netting CAD file over the target CAD file requires precise geometric registration within a common reference framework. The target and netting CAD representations may or may not share any common surfaces (i. e., the netting may or may not "touch" the target). Superposition allows the EM code process to capture the effects of interactions between the netting and the target; some rays may be modeled as passing through the netting and reflecting off the underlying target. These rays may or may not be retransmitted back through the netting. (If they are not, they are scattered within the netting.) The EM code serves three functions. It emulates the illumination of the netted target by the transmitted radar waveform. It generally includes a ray tracing module to specifically account for individual transmitted waveforms which strike the background, strike the netting and are reflected either away from or toward the antenna. It also performs the receiver functions of the radar, "collecting" reflected waveforms and accomplishing radar signal processing such as is required for representing a SAR radar mode.

Figure 2:
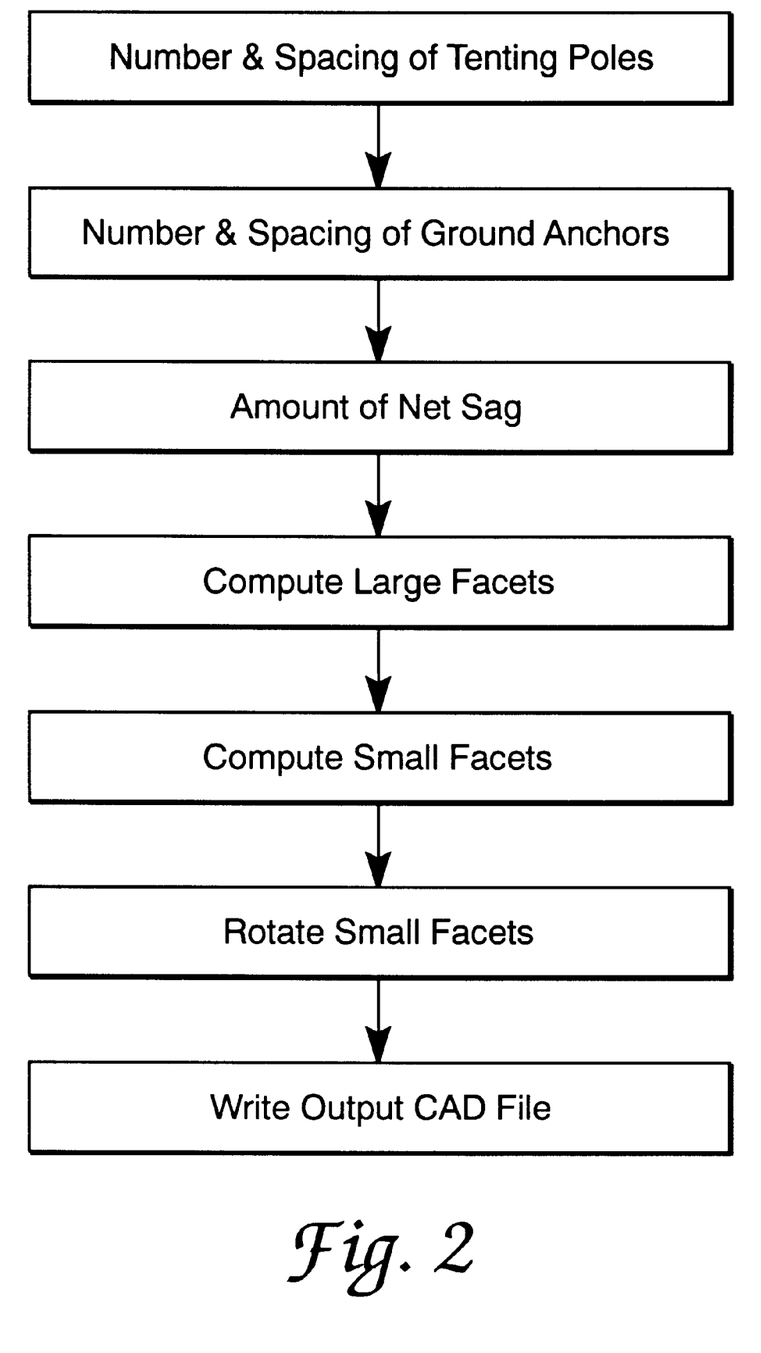
FIG. 2 is the top-level flow diagram of the invention.

As shown in FIG. 2, the invention includes the following sub-processes: (1) create a basic net outline description based on number and spacing of tent poles, number and spacing of ground anchors, and amount of net sag; (2) create a basic net description by computing large facets; (3) create a detailed net description by computing small facets; and (4) prepare an output description ready for analysis by rotating the small facets.

Figure 3:
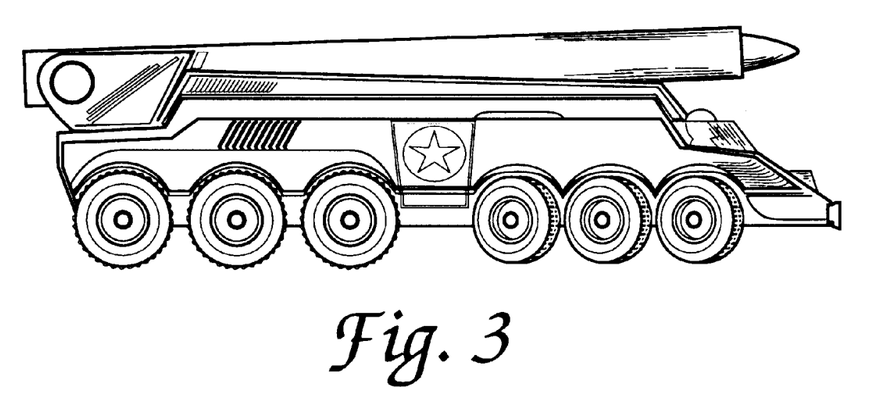
FIG. 3 is an example rendered CAD file of a target object.
Figure 4:
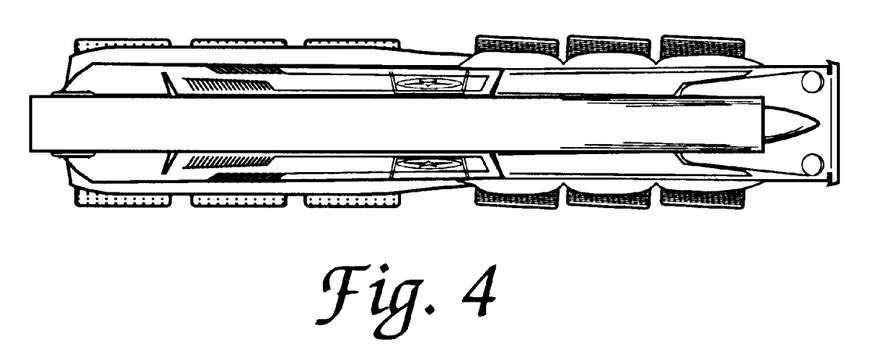
FIG. 4 is an example rendered CAD file of a target object, top view.
Figure 5:
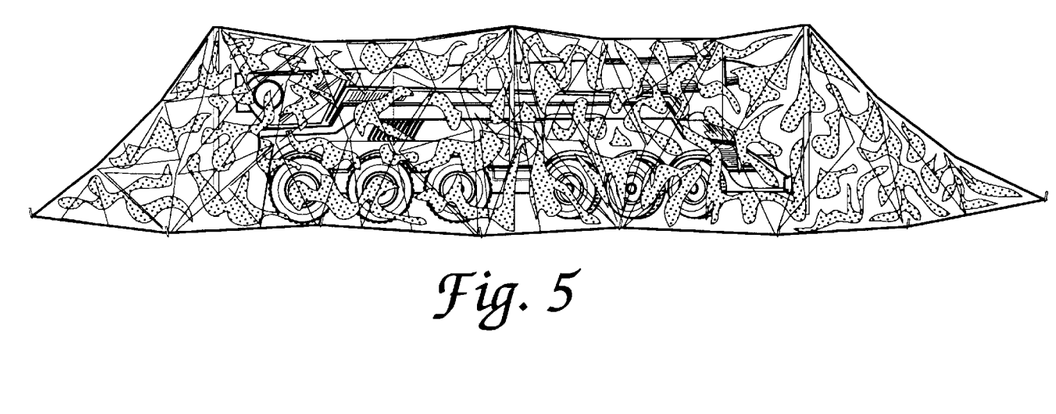
FIG. 5 is an example rendered CAD file of camouflage net.
Figure 6:
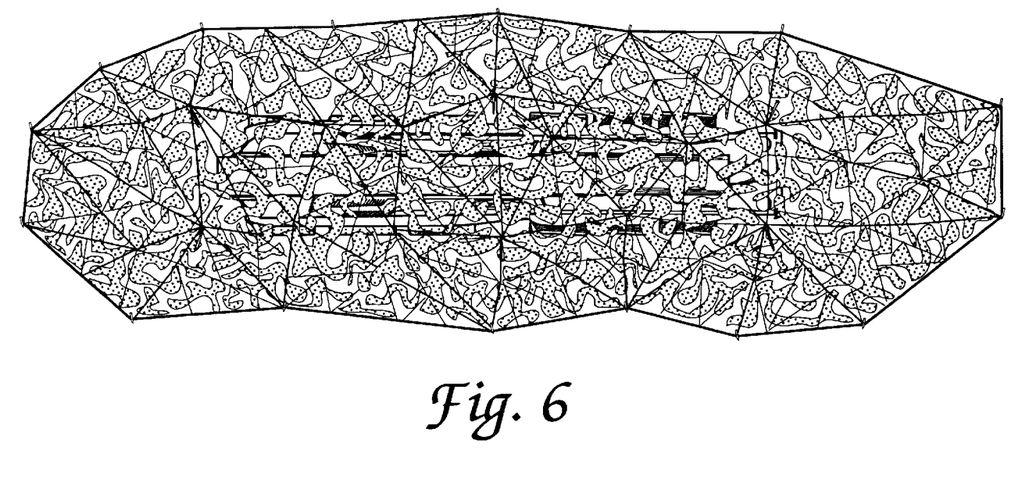
FIG. 6 is an example rendered CAD file of camouflage net and target object.

FIGS. 3–6 present rendered versions of the target and netting CAD files. FIG. 3 is a side view of the CAD file for a generic mobile missile (transporter-erector-launcher and missile) and FIG. 4 is a top view of the same target vehicle. FIG. 5 is a sideview of the vehicle under the radar scattering netting and FIG. 6 is a top view of the same combination.

Figure 7:
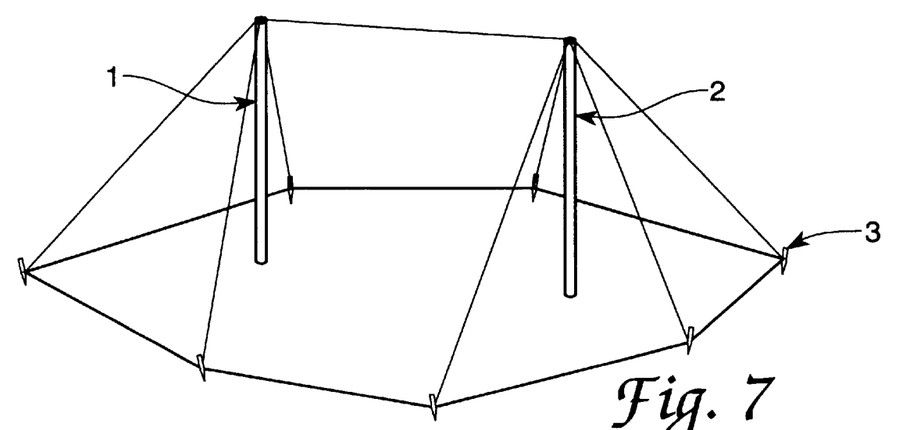
FIG. 7 is an example of a basic tent configuration.

The use of the invention begins with the specification (input) of the number, height, spacing of the tenting poles 1, 2 and the location of the ground anchors 3. The number of poles could be zero or one or more. The target object may act as tenting poles by coming in contact with the net. These parameters define the general size of the net to be simulated. See FIG. 7. A stored parameter sets the amount of sag in the net between the poles and between the poles and the ground anchor points. Thus, the net sag is shown by lowering the midpoint 4 of each line vertically by the default amount and defining two new lines, going from each respective end point to the new midpoint. Rather than line fit, it is anticipated that net sag could closer approximate a curved shape by smaller lines and decreasing the size of the large facets.

At this point, the invention describes the overall shape of the net to be simulated. See FIG. 8. This shape is then automatically divided into a number of (large) triangular facets 5 whose vertices are uniquely identified by the location (in three dimensions) of the pole tips and ground anchor points. Triangles are the simplest shapes for decomposing a net shape into flat surfaces suitable for electromagnetic analysis programs. The three dimensional points defined in the last step provided all of the data necessary to create the large facets when combined with knowledge of the desired outer shape.

Figure 11:
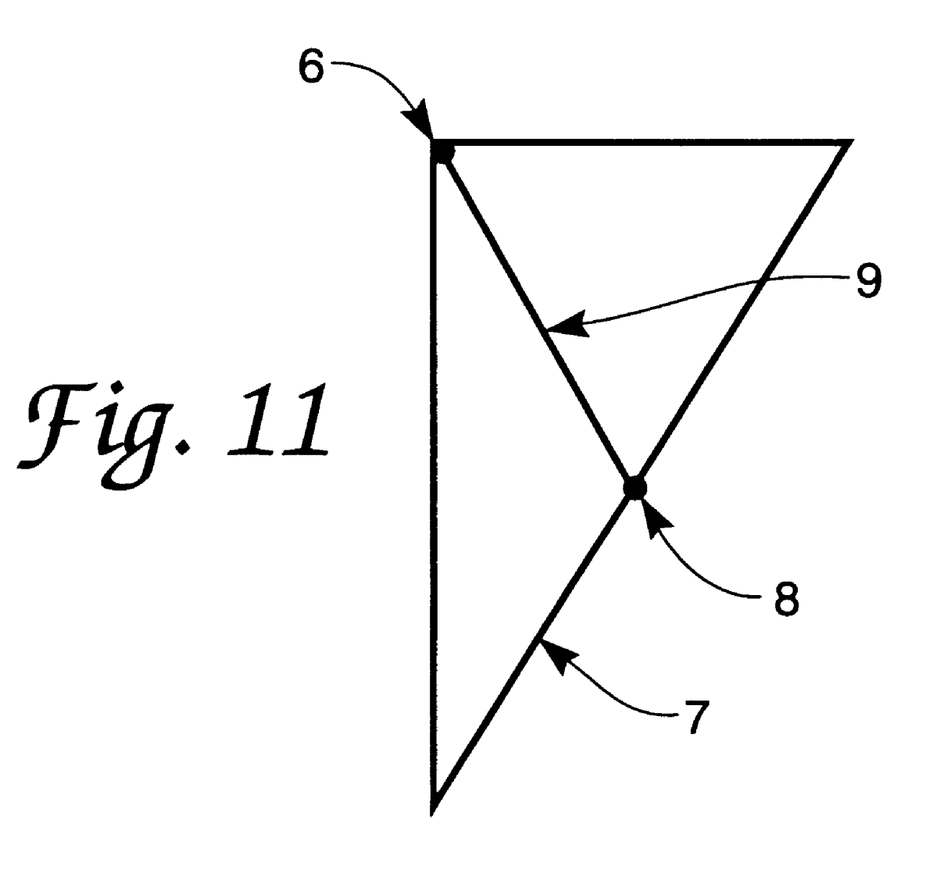
FIG. 11 is an example of one split of a facet into two facets used as part of the "Compute Small Facets sub-process".
Figure 12:
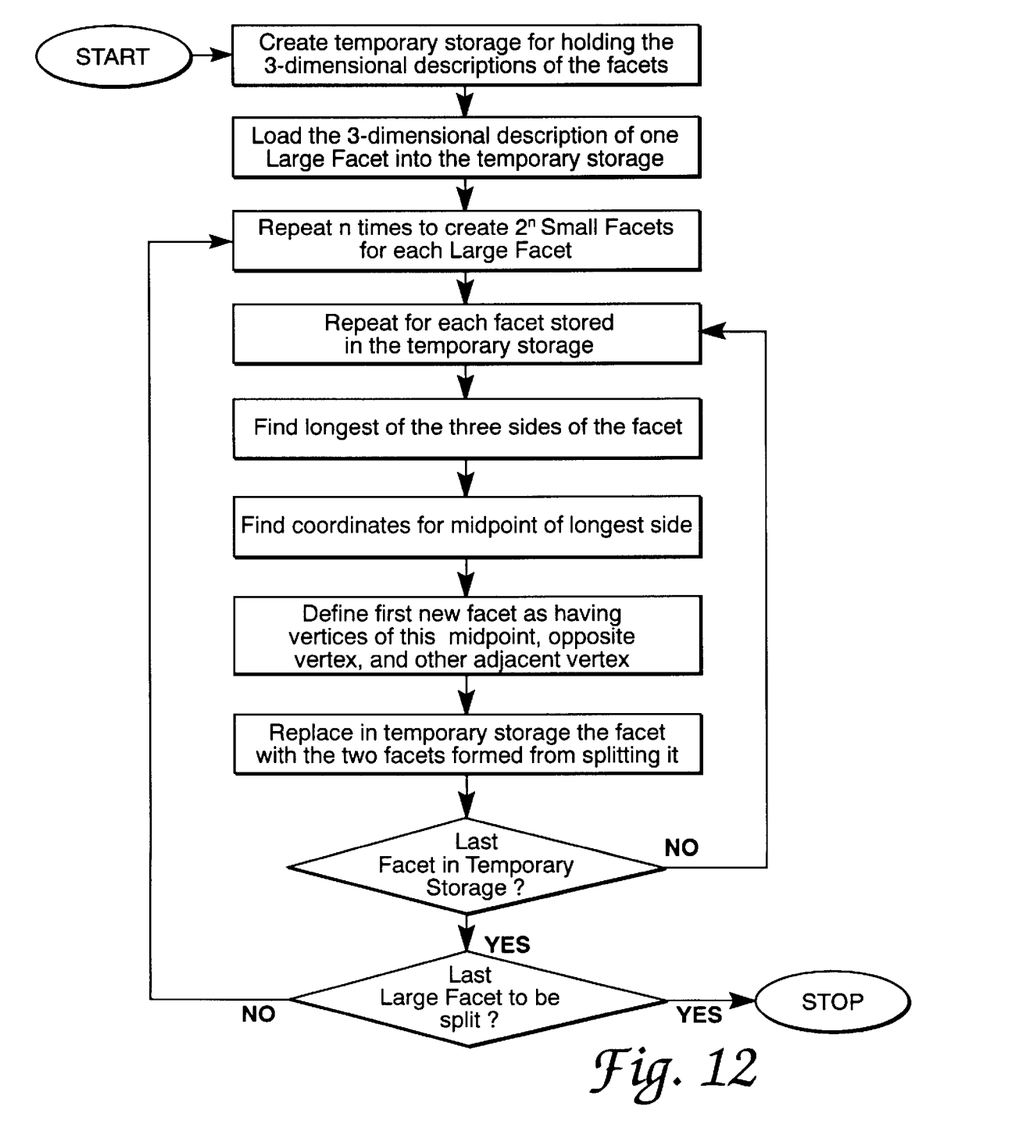
FIG. 12 is the flow diagram for the sub-process of "Compute Small Facets".
Figure 13:
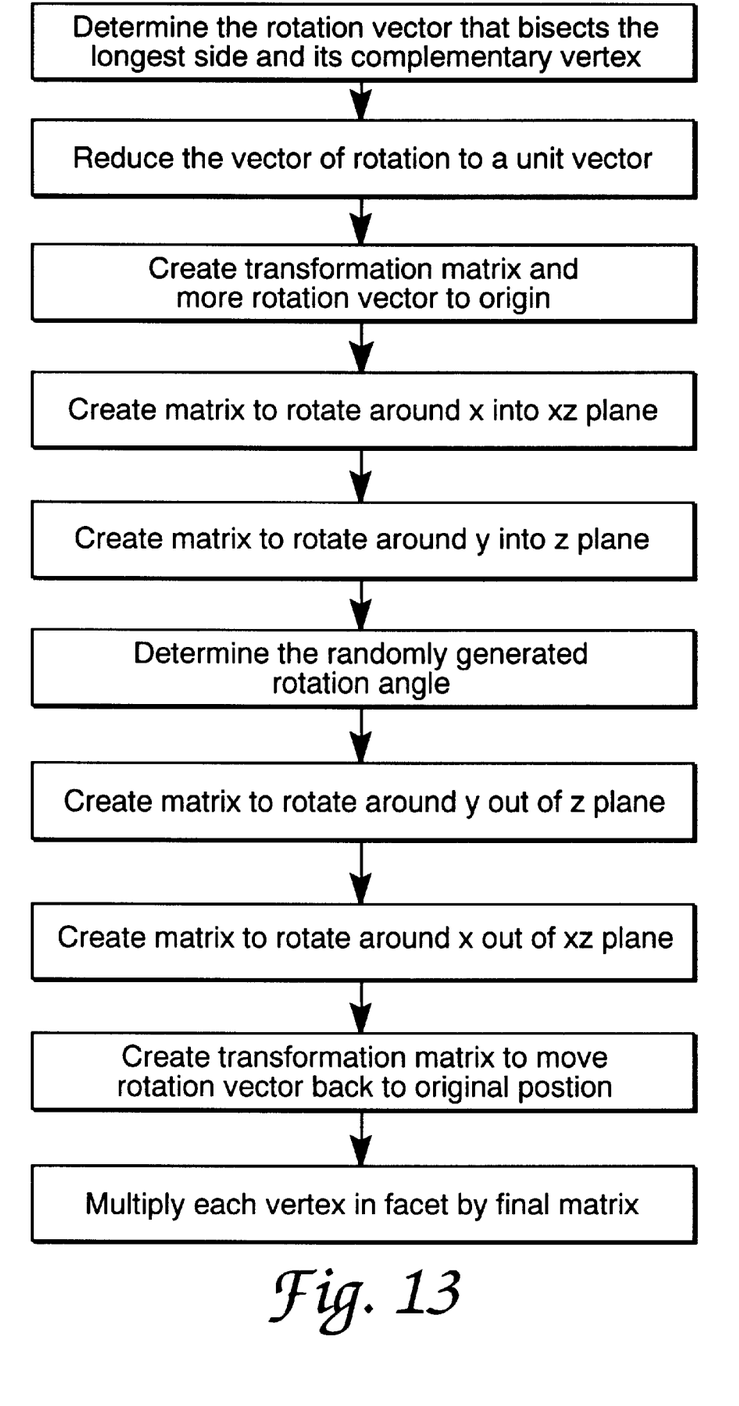
FIG. 13 is the flow diagram for the sub-process of "Rotate Small Facets".

As shown in FIG. 11, these large facets are then subdivided into a number (in the present embodiment $2^n$, where n is user-specified and depends on the wavelength of the radar to be simulated) of small facets, each lying in the plane of a large facet. See FIG. 12. The method includes looking at each facet, finding the longest of the three sides 7, adding a line 9 that bisects the facet from the midpoint 8 of the longest side 7 to the opposite vertex 6. The small facets may be further subdivided in the same manner to achieve a desired size for the small facets. For example, for X band radar, each small facet should be approximately 2–3 inches on an edge.

The small facets are then rotated about an axis which lies within the plane of the generating large facet. Rotating the small triangles approximates typical actual scattering netting that allows a more random reflection. The amount of the rotation is computed from a uniformly distributed random number generator with the angular limits of the permitted rotation based on the amount of radar cross section reduction (i.e., the radar scattering effect) to be achieved in the simulated image or signal. An output data file is then generated in a standard CAD format (such as ACAD).

Figure 10:
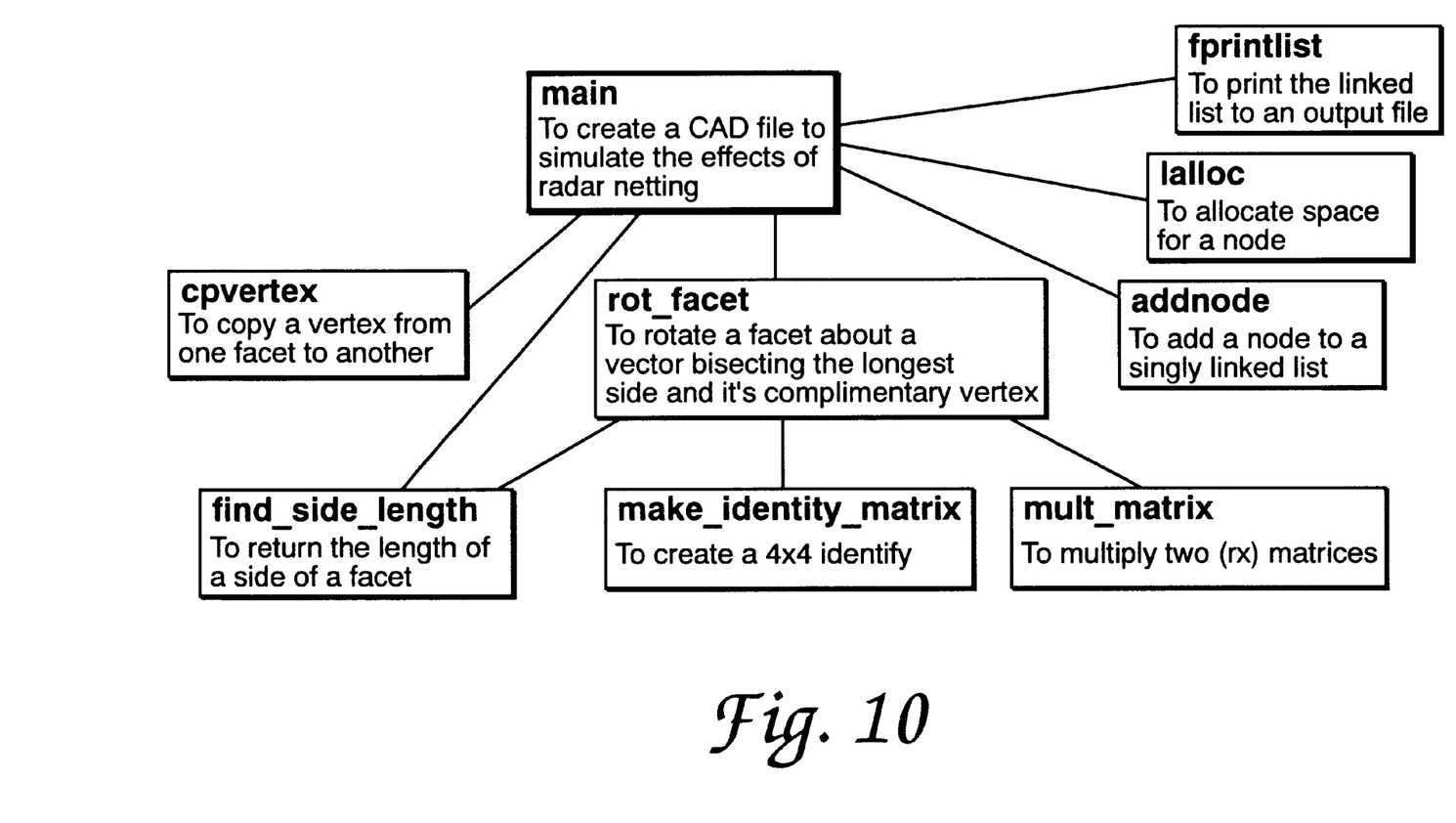
FIG. 10 is the program module structure of the preferred embodiment.

FIG. 10 provides the hierarchy of program modules that are implemented in the preferred embodiment. The main module creates a CAD file to simulate the effects of radar netting. The cpvertex module, called by the main module, and copies a vertex description from one facet to another. The rot_facet module, called by the main module, rotates a facet about a vector bisecting the longest side 7 and its complementary vertex 6. The find_side_length module, called by both the main and rot_facet modules, returns the length of a side of a facet. The addnode module, called by the main module, adds a node to a singly linked list. The lalloc module, called by the main module, allocates a space for a node. The fprintlist module, called by the main module, prints the linked list to an output file. The make_identity_matrix, called by the rot_facet module, creates a four-by-four identity matrix. The mult_matrix, called by rot_facet module, multiplies two matrices.

Figure 8:
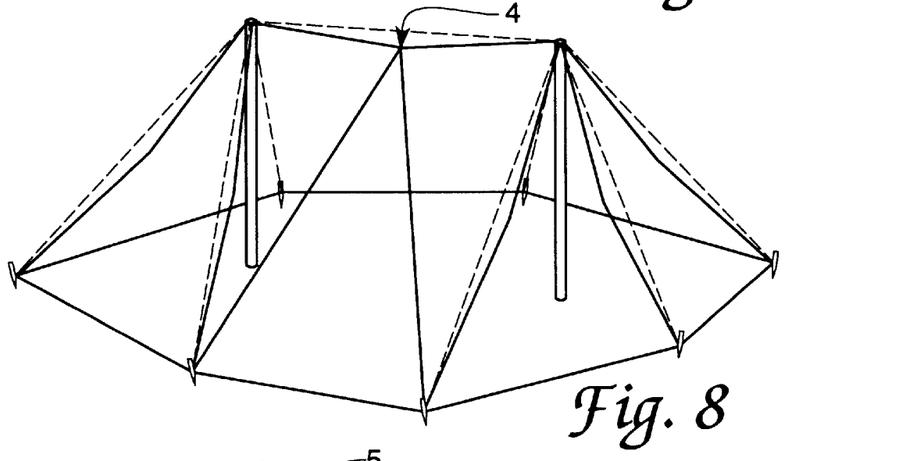
FIG. 8 is an example of adjusting the basic tent configuation for net sag.
Figure 9:
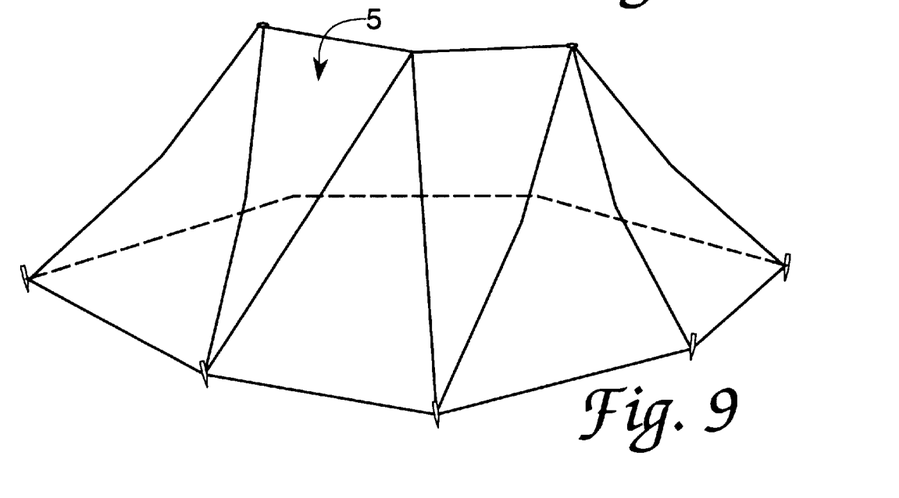
FIG. 9 is an example of subdividing the the basic tent configuration with net sag into an aggregation of large facets.

The module "rot_facet" performs the sub-process of "Rotate Small Facet" per the following steps shown in FIG. 8 of (1) determine the rotation vector that bisects the longest side and its complementary vertex; (2) reduce the vector of rotation to a unit vector; (3) Create transformation matrix and move rotation vector to origin; (4) Create matrix to rotate around x into xz plane; (5) Create matrix to rotate around y into z plane; (6) Determine the randomly generated rotation angle; (7) Create matrix to rotate around y about the xz plane; (8) Create matrix to rotate around x about yz plane; (9) Create transformation matrix to move rotation vector back to original position; and (10) Multiply each vertex in facet by final matrix.

A computer program for operating a preferred embodiment of the present invention is set forth below as an attachment at the end of this specification.

The present invention can be implemented with a number of alternatives:

1. The simulated netting may be draped over (i. e., allowed to contact the surface of) the object whose signature is to be reduced.

2. The degree of scattering by different portions of the net may be nonhomogeneous. This would result in "mottled" effect as well as a reduced signature which may be more effective against some seeker or target cueing/recognition algorithms.

3. The simulated scattering nets may be applied in CAD models of actual high value facilities and activities to develop optimum netting employment practices. (Air Base Operability, etc.)

4. The facets in the net CAD file could have material properties associated with them which would support the generation of seeker and sensor imagery and signal predictions in other portions of the electromagnetic spectrum (e. g., visible; near-, mid-, and far-wavelength infrared, etc.). This would support the application of the invention to multisensor and multispectral sensor/seeker applications.

The reported method and procedure offers the hitherto unattained objective of providing digital control over all significant target, target signature reduction treatment (netting), and imaging sensor parameters. Because of this control, absolute repeatability of the resulting simulated imagery is assured. Further, small variations in sensor, signature reduction treatment, and target can be introduced to support the conduct of parameter sensitivity analyses. As a result of this control, the process and procedure can be applied to the design optimization of netting treatments, to enhance friendly force capabilities, and to the analysis or reverse engineering of hostile netting practices. In the former case, the radar scattering properties of a net under design can be optimized with respect to a particular radar wavelength (or wavelengths), to a specified sensor resolution, and/or for a particular vehicle or other targets to be protected. In the latter case, reverse engineering, an actual sensor is assumed to have acquired imagery of an actual target. The process and procedure can be applied iteratively to obtain an understanding of the design principles applied by the hostile agency; when the actual and simulated images are judged to be appropriately alike, then the input parameters to the simulations can be accepted to be representative of the actual target treatment and imaging conditions.

Thus, while preferred features of the invention are described and illustrated herein, it is understood that changes and variations may be made by those skilled in the art without departing from the spirit and scope of the invention.

```
/****************************************************************
*       Program: rot_facet
*       Purpose: This program was written to create a CAD file to stimulate the
*               affects of radar netting. The resulting CAD file is used by
*               the SARSIM model to generate SAR images.
*       To Run: rotnet <infile> <outfile> <sub facets> <max rotation>
*               <scale x> <scale y> <scale z>
*       Calling Arguments: <infile> – (string) File containing simple net.
*               <outfile> – (string) File containing net with rotated facets.
*               <sub facets> – (int) Number of times to divide the facets.
*               <max rotation> – (float) Maximum degrees of rotation.
*               <scale x> – (float) Scale in the X direction.
*               <scale y> – (float) Scale in the X direction.
*               <scale z> – (float) Scale in the X direction.
*       Comments: Algorithm:
*               1) Read net CAD file (triangulated facet format)
*               2) Scale net
*               3) Divide each facet into n sub facets
*               4) Randomly rotate each facet
*               5) Print net CAD file
****************************************************************/
#include <device.h>
#include <stdio.h>
#include <gl.h>
#include <math.h>
#include <ctype.h>
#define X 0
#define Y 1
#define Z 2
/* Definition of a vertex - (X, Y, Z) */
typedef float Vertex[3];
/* Definition of a triangulated facet - three vertices */
typedef Vertex Facet[3];
/* Definition of a single linked dynamic list structure to store facets */
typedef struct node *Listptr;
typedef struct mode {
        Facet tri;
        Listptr next;
} Listnode;
/* Functions used in program - defined later */
Listptr addnode();
Listptr lalloc();
void fprintlist();
float find_side_len();
void cpvertex();
void cpvertex();
void mult_matrix();
void rot_facet();
void make_identity_matrix();
main(argc,argv)
```

```
int argc
char *argv[];
{
Listptr front;
Listptr front2;
Listptr prev;
Listptr curr;
Listptr fac1;
Listptr fac2;
int sub_fac;
float angle_of_rot;
int i,j;
float x1,x2,x3,y1,y2,y3,z1,z2,z3;
float s1,s2,s3;
float scale_x,scale_y,scale_z;
int dum;
FILE *fp;
FILE *out_fp;
/* initialize random number seed*/
srand(29);
/* initialize random number seed*/
srand(29);
/* initialize linked list */
front = NULL;
front2 = NULL;
prev = front;
/* get arguments */
if (argc != 7) {
        printf("Error in command format\n);
        print("USAGE:rotnet <infile> <outfile> <sub facets> <max rotation>/n");
        printf("     <scale x> <scale y> <scale z>\n");
        printf("argc = %d",argc);
        return(0);
}
fp = fopen(argv[1],"r");
out_fp = fopen(argv[2],"w");
sscanf(argv[3],"%d",&sub_fac);
sscanf(argv[4],"%f",&angle_of_rot);
sscanf(argv[5],"%f",&scale_x);
sscanf(argv[6],"%f",&scale_y);
sscanf(argv[7],"%f",&scale_z);
/* read net */
while fscan(fp,"%d %f %f %f %f %f %f %f %f %f",&dum,&x1,&y1,&z1,
        &x2,&y2,&z2,&x3,&y3,&z3) !=EOF) {
        fscanf(fp,"%d",%dum);
        curr=lalloc();
        curr->tri[0][X]=x1*scale_x;
        curr->tri[0][Y]=y1*scale_y;
        curr->tri[0][Z]=z1*scale_z;
        curr->tri[1][X]=x2*scale_x;
        curr->tri[1][Y]=y2*scale_y;
        curr->tri[1][X]=z2*scale_z;
        curr->tri[2][X]=x3*scale_x;
        curr->tri[2][Y]=y3*scale_y;
        curr->tri[2][Z]=z3*scale_z;
        front=addnode(front,curr);
}
/* divide the facets of the netting into 2 to the nth (where n is sub_fac)
 number of sub facets */
for (j=0;j<sub_fac;j++){
        /* initialize a new list (front2), the facets created by splitting will
          be placed in this temporary list */
        front2=NULL;
        while (front !=NULL) {
                fac1 = lalloc();
                fac2 = lalloc();
                /* find the longest side and bisect it*/
                s1 = find_side_len(front,0,1);
                s2 = find_side_len(front,1,2);
                s3 = find_side_len(front,2,0);
                /*split side 1 vertices 0 & 1*/
                if ((s1 > s2) && (s1 > s3)){
                        cpvertex(front,2,fac1,0);
                        cpvertex(front,0,fac1,1);
                        fac1->tri[2][X] = (front->tri[0][X]+front->tri[1][X])/2;
                        fac1->tri[2][Y] = (front->tri[0][Y]+front->tri[1][Y])/2;
                        fac1->tri[2][Z] = (front->tri[0][Z]+front->tri[1][Z])/2;
                        cpvertex(front,1,fac2,0);
                        cpvertex(fac1,2,fac2,1);
                }
```

```
                        /*split side 2 vertices 1 & 2 */
                        else if(s2 > s3) {
                                cpvertex(front,0,fac1,0);
                                cpvertex(front,1,fac1,1);
                                fac1->tri[2][X] = (front->tri[1][X]+front->tri[2][X])/2;
                                fac1->tri[2][Y] = (front->tri[1][Y]+front->tri[2][Y])/2;
                                fac1->tri[2][Z] = (front->tri[1][Z]+front->tri[2][Z])/2;
                                cpvertex(front,0,vac2,0);
                                cpvertex(front,2,fac2,1);
                                cpvertex(fac1,2,fac2,2);
                        }
                        /*split side 3 vertices 2 & 0 */
                        else {
                                cpvertex(front,1,fac1,0);
                                cpvertex(front,2,fac1,1);
                                fac1->tri[2][X] = (front->tri[2][X]+front->tri[0][X])/2;
                                fac1->tri[2][Y] = (front->tri[2][Y]+front->tri[0][Y])/2;
                                fac1->tri[2][Z] = (front->tri[2][Z]+front->tri[0][Z])/2;
                                cpvertex(front,1,fac2,0);
                                cpvertex(front,0,fac2,1);
                                cpvertex(fac1,2,fac2,2);
                        }
                        /*add the 2 new facets to the list in front2*/
                        front2 = addnode(front2,fac1);
                        front2 = addnode(front2,fac2);
                        /*delete old facet from list front*/
                        curr = front;
                        front = front->next;
                        free(curr);
                }
                /* swap lists and split facets again */
                front = front2;
                front2 = NULL;
        }
/* For each facet in list rotate it and place it in list2 */
        while (front !=NULL) {
                curr = front;
                front = front->next;
                rot_facet(curr);
                front2 = addnode(front2,curr);
        }
        front = front2;
        /* Print the list to output file */
        fprintlist(front,out_fp);
}
/**********************************************************************
*       void rot_facet(p,rangle)
*       Purpose: To rotate a facet about a vector biseting the longest side
*                and its complimentary vertex. The range of rotation is defined
*                by + or minus rangle.
*       Invoked By: main    Invokes: make_identify_matrix, find_side_len
*       Calling Arg; p = pointer to facet; rangle = max allowable facet rotation
**********************************************************************/
void rot_facet(p,rangle)
Listptr p;
float rangle;
{
int s1,s2,s3;
float x1,x2,y1,y2,z1,z2;
float a,b,c,d;
float length;
Matrix temp,cum1,cum2;
float max_angle;
float temp_x;
float temp_y;
float temp_z;
int l;
float angle;
        make_identity_matrix(temp);
        make_identity_matrix(cum1);
        make_identity_matrix(cum2);
        /*find the longest side*/
        s1 = find_side_len(p,0,1);
        s2 = find_side_len(p,1,2);
        s3 = find_side_len(p,2,0);
        /* determine the rotation vector, the rotation vector bisects the longest
        side and its complementary vertex */
        if ((s1 > s2) && (s1 > s3)) {
                x1 = p->tri[2][X];
                y1 = p->tri[2][Y];
```

-continued

```
            z1 = p->tri[2][Z];
            x2 = p->tri[2][X];+p->tri[1][X])/2;
            y2 = p->tri[2][Y];+p->tri[1][Y])/2;
            z2 = (p->tri[2][Z];+p->tri[1][Z])/2;
    }
    else if (s2 > s3) {
            x1 = p->tri[0][X];
            y1 = p->tri[0][Y];
            z1 = p->tri[0][Z];
            x2 = p->tri[1][X]+p->tri[2][X])/2;
            y2 = p->tri[1][Y]+p->tri[2][Y])/2;
            z2 = p->tri[1][Z]+p->tri[2][Z])/2;
    }
    else {
            x1 = p->tri[1][X];
            y1 = p->tri[1][Y];
            z1 = p->tri[1][Z];
            x2 = p->tri[0][X]+p->tri[1][X])/2;
            y2 = p->tri[1][Y]+p->tri[2][Y])/2;
            z2 = p->tri[1][Z]+p->tri[2][Z])/2;
    }
    /* reduced the vector of rotation to a unit vector */
    a = x2 - x1;
    b = y2 - y1;
    c = z2 - z1;
    length = sqrt((a*a)+(b*b)+(c*c));
    a = a/length;
    b = b/length;
    c = c/length;
    d = sqrt((b*b)+(c*c));
    /* Create transformation matrix and move rotation vector to origin */
    cum1[3][0] = -x1;
    cum1[3][1] = -y1;
    cum1[3][2] = -z1;
    /* Create matrix to rotate around x into xz plane */
    make_identity_matrix(temp);
    if (d != 0) {
            temp[1][1] = c/d;
            temp[1][2] = b/d;
            temp[2][1] = -b/d;
            temp[2][2] = c/d;
    }
    mult_matrix(cum1,temp,cum2);
    /* Create matrix to rotate around y into z plane */
    make_identity_matrix(temp);
    temp[0][0] = d;
    temp[0][2] = a;
    temp[2][0] = -a;
    temp[2][2] = d;
    mult_matrix(cum2,temp,cum1);
    /* Determine the randomly generated rotation angle */
    max_angle = M_PI*rangle/180.0;
    angle = (float)(rand()*max_max_angle/32768.0)-(max_angle/2.0);
    make_identity_matrix(temp);
    temp[0][0] = cos(angle);
    temp[0][1] = sin(angle);
    temp[1][0] = -sin(angle);
    temp[1][1] = cos(angle);
    /* Create matrix to rotate around y out of z plane */
    make_identity_matrix(temp);
    temp[0][0] = d;
    temp[0][2] = -a;
    temp[2][0] = a;
    temp[2][2] = d;
    mult_matrix(cum2,temp,cum1);
    /* Create matrix to rotate around x out of xz plane */
    make_identity_matrix(temp);
    if (d != 0) {
            temp[1][1] = c/d;
            temp[1][2] = -b/d;
            temp[2][1] = b/d;
            temp[2][2] = c/d;
    }
    mult_matrix(cum1,temp,cum2);
    /* Create transformation matrix to move rotation vector back to
    original position */
    make_identity_matrix(temp);
    temp[3][0] = x1;
    temp[3][1] = y1;
    temp[3][2] = z1;
```

```
            mult_matrix(cum2,temp,cum1);
            /* Multiply each vertex in facet by final matrix */
            for (i=0;i<3;i++){
                    temp_x = p->tri[i][X];
                    temp_y = p->tri[i][Y];
                    temp_z = p->tri[i][Z];
                    p->tri[i][X] =   cum1[0][0]*temp_x + cum1[1][0]*temp_y +
                                     cum1[2][0]*temp_z + cum1[3][0];
                    p->tri[i][Y] =   cum2[0][1]*temp_x + cum1[1][1]*temp_y +
                                     cum1[2][1]*temp_z + cum1[3][1];
                    p->tri[i][Z] =   cum1[0][2]*temp_x + cum1[1][2]*temp_y +
                                     cum1[2][2]*temp_z + cum1[3][2];
            }
}
/**************************************************************
*       addnode
*       Purpose: Adds a node to a singly linked list
*       Invoked By: main      Invoked: (nothing)
*       Calling Arguments: f - pointer to front of list; n - pointer to added note
**************************************************************/
Listptr addnode(f,n)
Listptr f;
Listptr n;
{
        if (f = NULL) {
                n->next=NULL;
                f = n;
        }
        else {
                n->next = f;
                f = n;
        }
        return(f);
}
/**************************************************************
*       lalloc
*       Purpose: Allocate space for a node
*       Invoked By: main      Calling Arguments: (none)
**************************************************************/
Listptr lalloc()
{
        return (Listptr) malloc(sizeof(Listnode));
}
/**************************************************************
*       fprintlist
*       Purpose: To print the linked list to an output file
*       Invoked by: main      Invokes: (nothing)
*       Calling Arguments: f - pointer to the head of the list; out - The output file
*       Comments: This program creates indices for facets to be used in SAR-
*           SIM. Indices may have to change if output added to target,
**************************************************************/
void fprintlist(f,out)
Listptr f;
FILE *out;
{
        int l=0;
        while (f!=NULL){
                l++;
                fprintf(out,"%4d %8.3f %8.3f %8.3f %8.3f %8.3f %8.3f %8.3f %8.3f %8.3f\n",
                        l,
                        f->tri[0][0],
                        f->tri[0][1],
                        f->tri[0][2],
                        f->tri[1][0],
                        f->tri[1][1],
                        f->tri[1][2],
                        f->tri[2][0],
                        f->tri[2][1],
                        f->tri[2][2];
                fprintf(out,"0\n");
                f = f->next;
        }
        printf("\n");
}
/**************************************************************
*       find_side_length
*       Purpose: This program returns the length of a side of a facet. The side
*           is determined by indices: v1 & v2.
*       Invoked By: main, rot_facet      Invokes: (nothing)
```

```
*       Calling Arguments: p - pointer to facet; v1 - index to a vertice in facet;
*               v2 - An index to a vertice in facet
******************************************************************/
float find_side_len(p,v1,v2)
Listptr p;
int v1;
int v2;
{
        float x,y,z;
        x = p->tri[v1][0] - p->tri[v2][0];
        y = p->tri[v1][1] - p->tri[v2][1];
        z = p->tri[v1][2] - p->tri[v2][2];
        return(sqrt((x*x)+(y*y)+(z*z)));
}
/******************************************************************
*       make_identity_matrix
*       Purpose: Creates an identity (4x4) matrix.
*       Invoked By: rot_facet     Invokes: (nothing)
*       Calling Arguments: m - The array set to the identity matrix
******************************************************************/
void make_identity_matrix(m)
Matrix m;
{
m[0][0] = 1;
m[0][1] = 0;
m[0][2] = 0;
m[0][3] = 0;
m[1][0] = 0;
m[1][1] = 1;
m[1][2] = 0;
m[1][3] = 0;
m[2][0] = 0;
m[2][1] = 0;
m[2][2] = 1;
m[2][3] = 0;
m[3][0] = 0;
m[3][1] = 0;
m[3][2] = 0;
m[3][3] = 1;
}
/******************************************************************
*       mult_matrix
*       Purpose: Multiplies two (rx) matrices
*       Invoked By: rot_facet     Invokes: (nothing)
*       Calling Arguments: A - First matrix; B - second; C - The product A.
******************************************************************/
void mult_matrix(A,B,C);
Matrix A;
Matrix B;
Matrix C;
{
        int i,j,k;
        for(i=0;i<4;i++){
                for(j=0;j<4;j++){
                        C[i][j] = 0.0;
                        for(k=0;k<4;k++){
                                C[i][j] = C[i][j] + (A[i][j])*B[k][j]);
                        }
                }
        }
}
/******************************************************************
*       cpvertex
*       Purpose: Copies a vertex from one facet to another
*       Invoked By: main     Invokes: (nothing)
*       Calling Arguments: p1 - A pointer to the facet to be copied; v1 - index of
*                        vertex to be copied; p2 - pointer to destination facet;
*                        v2 - An index of the destination vertex
******************************************************************/
void cpvertex(p1,v1,p2,v2)
Listptr p1;
int v1;
Listptr p2;
int v2;
{
        p2->tri[v2][X] = p1->tri[v1][X];
        p2->tri[v2][Y] = p1->tri[v1][Y];
        p2->tri[v2][Z] = p1->tri[v1][Z];
}
```

It is claimed:

1. A computer implemented method for designing a controlled simulated imagery approximating an actual electromagnetic scattering net in three dimensions for analyzing effect on sensor imagery, comprising:

inputting a basic tent configuration comprising a number of tent poles, a spacing of tent poles, a covering net, an amount of net sag, and a plurality of locations of ground anchor points for said covering net;

dividing said covering net into a plurality of large triangular shaped facets;

subdividing each said large triangular shaped facet into a plurality of small facets of a desired size;

rotating said small facets; and outputting a description of rotated small facets.

2. The method of claim 1, in which said number of small facets is a multiple of two, chosen to correspond to a radar wavelength.

3. The method of claim 2, further including the step of associating with said small facets characteristics of material properties supporting the generation of sensor imagery in different portions of the electromagnetic spectrum.

4. The method of claim 1, in which said outputting a description of rotated small facets is further comprised of superimposing a three-dimensional Computer Aided Design (CAD) description of a target on said description of rotated small facets.

5. The method of claim 1, wherein said small facets are rotated about an axis in the plane of the large triangular shaped facet.

6. The method of claim 1, in which said subdividing each large triangular shaped facet into a plurality of said small facets is accomplished by bisecting the large triangular shaped facet along a line from a midpoint of a longest side to its opposite vertex and then further bisecting the resulting facets in the same manner until said desired size is achieved.

7. The method of claim 1, in which the step of rotating each said small facet is further comprised of the following steps:

determining a rotation vector that bisects its longest side and its opposite complementary vertex;

reducing said rotation vector to a unit vector;

creating a transformation matrix and moving said rotation vector to its origin;

creating a matrix to rotate the first dimension about a plane defined by the first and third dimensions;

creating a matrix to rotate the second dimension about the plane defined by the third dimension;

determining a randomly generated rotation angle;

creating a matrix to rotate the second dimension about the third dimension;

creating a matrix to rotate around the first dimension about the plane defined by the first and third dimensions;

creating a transformation final matrix to move the rotation vector back to the original position; and multiplying each vertex of said small facet by said final matrix.

8. The method of claim 1, wherein said rotating of each small facet is randomly done to create a mottled net surface.

9. The method of claim 1, in which said outputting a description of rotated small facets is done in standard CAD format for inputting to electromagnetic code to produce a radar image.

10. A computer implemented method for preparing a description of an electromagnetic scattering net approximating an actual scattering net in three dimensions for analyzing effect on sensor imagery, comprising:

inputting a basic tent configuration comprising a number of tent poles, a spacing of tent poles, a covering net, an amount of net sag, and a plurality of locations of ground anchor points for said covering net;

dividing said covering net into a plurality of large triangular shaped facets;

subdividing each said large triangular shaped facet into a plurality of small facets of a desired size by bisecting said large facet along a line from a midpoint of a longest side to its opposite vertex and then further bisecting the resulting facets in the same manner until said desired size is achieved;

rotating said small facets about an axis in the plane of the large triangular shaped facets; and outputting a description of rotated small facets formatted in standard Computer Aided Design (CAD) format for inputting to electromagnetic code to produce a radar image.

11. The method of claim 10, in which said rotating each small facet is further comprised of the following steps:

determining a rotation vector that bisects its longest side and its opposite complementary vertex;

reducing said rotation vector to a unit vector;

creating a transformation matrix and moving said rotation vector to its origin;

creating a matrix to rotate a first dimension about the plane defined by the first and third dimensions;

creating a matrix to rotate the second dimension about the plane defined by the third dimension;

determining a randomly generated rotation angle;

creating matrix to rotate the second dimension about the third dimension;

creating a matrix to rotate around first dimension about the plane defined by first and third dimensions;

creating a transformation final matrix to the move rotation vector back to its original position; and multiplying each vertex of said small facet by said final matrix.

12. The method of claim 10, herein said rotating of said small facets is randomly done to create a mottled net surface.

13. The method of claim 10, in which said number of small facets is a multiple of two, chosen to correspond to a radar wavelength.

14. The method of claim 13, further including the step of associating with said small facets characteristics of material properties supporting the generation of sensor imagery in different portions of the electromagnetic spectrum.

15. A computer implemented apparatus for designing a controlled simulated imagery approximating an actual electromagnetic scattering net in three dimensions for analyzing effect on sensor imagery, comprising:

means for describing a basic tent configuration comprising a number of tent poles, a spacing of tent poles, a covering net, an amount of net sag, and a plurality of locations of ground anchor points for said covering net;

means for dividing said covering net into a plurality of large triangular shaped facets;

means for subdividing each said large triangular shaped facet into a plurality of small facets of a desired size by bisecting said large facet along a line from a midpoint of a longest side to its opposite vertex and then further bisecting the resulting facets in the same manner until said desired size is achieved;

means for rotating said small facets about an axis in the plane of the large triangular shaped facets; and means for generating in Computer Aided Design format a description of the rotated small facets suitable for being added to three-dimensional descriptions of a target and for being analyzed by electronic sensor imaging simulation.

\* \* \* \* \*